Feb. 11, 1958     B. WALKER     2,823,070
REAR FENDER COMPARTMENT FOR SPARE TIRE
Original Filed Oct. 11, 1952
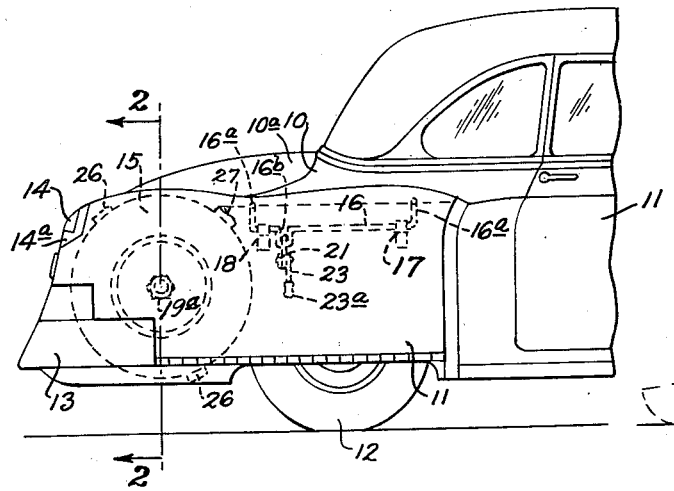
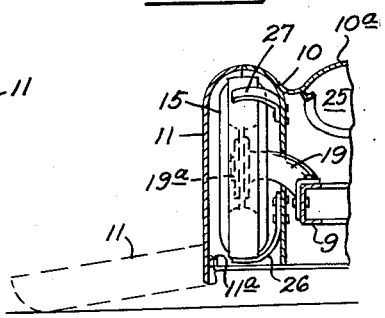
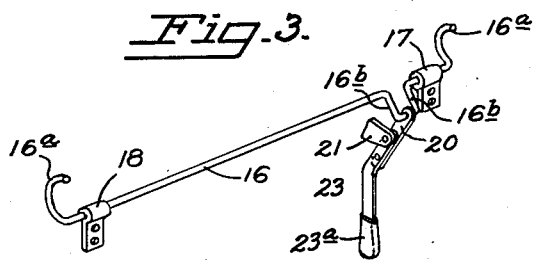
INVENTOR.
Brooks Walker 2,823,070

Patented Feb. 11, 1958

2,823,070

REAR FENDER COMPARTMENT FOR SPARE TIRE

Brooks Walker, Piedmont, Calif.

Original application October 11, 1952, Serial No. 314,265, now Patent No. 2,773,719, dated December 11, 1956. Divided and this application December 19, 1955, Serial No. 557,818

6 Claims. (Cl. 296—37.2)

This invention pertains to an improvement in a motor vehicle and particularly to an improved compartment within the portion of the rear fender rearwardly of the rear wheel or in the portion of the vehicle body rearwardly of the rear wheel; said compartment being accessible by opening a portion of the rear fender; the locking of the rear fender in place being accomplished from a hood lock type of control preferably operated from within the normal rear luggage compartment, thus eliminating additional means of locking the spare tire when located in said compartment other than the rear deck lock. Such rear fender compartment will, in general, be outside the regular frame section extending inside and rearwardly of the rear tires. This application is a division of application Serial No. 314,265, filed October 11, 1952, now Patent No. 2,773,719.

This compartment may be adapted to receive a spare tire, battery, luggage, etc. In previous constructions the spare tire has generally been located in the luggage compartment or at the exterior of the vehicle. This construction allows the space at the rear of the rear wheels to be used to carry the spare tire or luggage and provides access by opening the fender somewhat like a hood opens to provide access to the spare tire and wheel in this compartment. It allows readily detachable means, such as a removable hinge pin or the like, for removing the rear fenders for replacement or repair in case of fender damage. It also allows the rear fenders to come down over the rear wheels without needing wheel "pants" as now used on Cadillacs and other modern automobiles. These movable rear fenders allow ready access for changing rear tires and wheels, working on rear brakes, springs and putting on chains. To install chains on present cars where the fenders almost cover the rear wheels and the fenders are not removable is very difficult, compared to the ease of attaching tire chains with this invention, after the fenders have been either moved or removed.

Other features of this invention will be more particularly pointed out in the attached specifications and claims.

I have shown my invention in the accompanying drawing in which Fig. 1 shows a side elevation of the rear portion of a vehicle incorporating this invention.

Fig. 2 is a sectional view from the front of the vehicle of one rear corner of the vehicle taken at section 2—2 of Fig. 1.

Fig. 3 is a perspective view of one form of fender locking mechanism such as is shown in Figs. 1 and 2.

On all views like numerals of reference refer to corresponding parts.

On Figs. 1, 2, and 3 we show a vehicle body 10 having a rear wheel fender 11, a rear bumper 13, a tail light 14, a spare tire 15 mounted on bracket 19 by bolt 19a. Bracket 19 is in turn mounted on the car frame 9 or other suitably rigid portion of the body, possibly just a slight recess to fit the tire in the metal wall between the luggage compartment 25 and the rear fender spare tire compartment or by bolting the tire against brackets that fit the spare tire such as brackets 26 and 27.

The rear fender 11 of this car is hinged at its lower edge like a Cadillac fender "pants" at a point near the front edge of the rear bumper 13 and near the lower rear corner of the rear body door or at a point preferably forward of the rear wheel. The top of the fender is engaged by two or more clamps such as 16a of fender lock rod 16 and held in locked position by past center toggle 23 and handle 23a which are pivoted to the car body 10 by bracket 21. Link 20 ties toggle arm 23 to crank 16b of shaft 16. When handle 23a is raised after unlocking and opening the luggage compartment door 10a, the right rear fender 11 will be unlocked along its upper edge adjacent to body 10 and free to be lowered toward the ground as shown in Fig. 2 or removed completely from the vehicle. The tail light 14 is preferably attached to the body 10 with a lower edge 14a adapted to engage and disengage said rear fender 11. When fender 11 is swung about its pivots 11a at the forward and rearward edges of the fender on the pivot and disconnect line, the spare tire can then be easily removed and the rear tire can also be easily accessible for changing, or for working on or near the rear tire and wheel, or for putting on tire chains, etc.

Where the term luggage compartment has been used, it is understood that with rear engine design the compartment could house the engine with or without luggage.

I do not wish in any way to limit myself to the exact details or mode of operation set forth in the specifications and drawings without departing from the spirit and scope of my invention which is set forth in the following claims.

I claim as my invention:

1. A vehicle having a body, rear wheels, a portion of said body covering said rear wheels and forming a first compartment in back of said rear wheels, means in said first compartment for supporting therein an inflated spare tire and rim assembly substantially vertically and substantially in line with one of said rear wheels, a second compartment located largely rearwardly and between said rear wheels, a centrally located door at the rear of said vehicle, said door providing access only to said second compartment, a partition separating said first compartment from said second compartment, a side wall portion of said body mounted on hinges along its lower edges generally parallel to the longitudinal axis of said vehicle and serving as a sole door to said first compartment, and locking means for said first compartment door, said locking means extending into and being operable only from said second compartment.

2. A vehicle having a body, rear wheels, a portion of said body covering said rear wheels, a first compartment directly in back of one of said rear wheels having means to retain an inflated spare tire and rim assembly in a vertical position, a side wall of said first compartment mounted on horizontal hinges generally parallel to the longitudinal axis of said vehicle, a second compartment at the rear of said vehicle beside said first compartment and separated therefrom, a door to said second compartment at the center rear thereof, and locking means for said first compartment side wall, said locking means having control means therefor extending into and operable from said second compartment.

3. A vehicle body having a rear wheel housing and a plurality of storage compartments, one of said storage compartments being disposed rearwardly of and substantially aligned with the rear wheel housing, another of said storage compartments being disposed adjacent to and separate from said one storage compartment, support means in said one storage compartment for supporting an article placed therein, said vehicle body further having a side wall portion serving as a partial closure member for said one storage compartment, mounting means adjacent the lower edge of said side wall portion hingeably mounting said side wall portion for movement between a first position wherein said side wall portion partially closes said one storage compartment and a second position which permits access thereto, and locking means for securing said closure member in said first position, said locking means extending into and being operable from inside the said another storage compartment.

4. The structure as set forth in claim 3, wherein said one storage compartment is of sufficient size to carry an inflated spare tire and rim assembly in a substantially vertical position and substantially aligned with the rear wheel housing of the body.

5. The structure as set forth in claim 3 wherein the article placed in the said one storage compartment comprises a spare tire and wheel assembly, said wheel having apertures therein by which said spare tire and wheel assembly is supported in said one storage compartment and said support means includes securing means passing through at least one of said apertures of the wheel.

6. A vehicle body having a rear wheel housing and a storage compartment, said storage compartment being disposed rearwardly of and substantially aligned with said rear wheel housing, support means in said storage compartment for supporting an article placed therein, said vehicle body further having a side wall portion serving as a partial common closure member for both said storage compartment and said rear wheel housing, hinge means adjacent the lower edge of said side wall portion moveably mounting said side wall portion for movement between a first position wherein said side wall portion partially closes both said storage compartment and said rear wheel housing and a second position which permits access to an article in said storage compartment and a rear wheel mounted in said rear wheel housing.

References Cited in the file of this patent

UNITED STATES PATENTS

| | | |
|---|---|---|
| 2,196,225 | Morrison | Apr. 9, 1940 |
| 2,447,397 | Craig | Aug. 17, 1948 |
| 2,606,625 | Paton | Aug. 12, 1952 |
| 2,655,389 | Soroka | Oct. 13, 1953 |
| 2,700,572 | Torrance | Jan. 25, 1955 |

FOREIGN PATENTS

| | | |
|---|---|---|
| 631,921 | Great Britain | Nov. 11, 1949 |
| 1,064,655 | France | Dec. 30, 1953 |